United States Patent [19]

Fan

[11] Patent Number: 5,469,522
[45] Date of Patent: Nov. 21, 1995

[54] OPTICAL FIBER SPLICE INTERCONNECTION AND USAGE METHOD

[75] Inventor: Robert J. Fan, Canoga Park, Calif.

[73] Assignee: LiteCom, Inc., Canoga Park, Calif.

[21] Appl. No.: 162,525

[22] Filed: Dec. 2, 1993

[51] Int. Cl.$^6$ ........................................... G02B 6/38
[52] U.S. Cl. ..................... 385/98; 385/97; 385/72
[58] Field of Search ................... 385/95, 96, 97, 385/98, 99, 52, 65, 83, 72, 107, 111, 135

[56] References Cited

U.S. PATENT DOCUMENTS

| | | | |
|---|---|---|---|
| 3,919,037 | 11/1975 | Miller | 385/98 X |
| 4,179,186 | 12/1979 | Tynes | 385/98 |
| 4,248,499 | 2/1981 | Liertz et al. | 385/98 |
| 4,773,724 | 9/1988 | Bjornlie | 350/96.2 |
| 4,818,055 | 4/1989 | Patterson | 385/99 |
| 5,029,972 | 7/1991 | Lukas et al. | 385/95 |
| 5,042,902 | 8/1991 | Huebscher et al. | 385/95 X |
| 5,061,034 | 10/1991 | Fujikawa et al. | 385/95 |
| 5,081,695 | 1/1992 | Gould et al. | 385/107 |
| 5,085,494 | 2/1992 | Wesson et al. | 385/98 |
| 5,127,076 | 6/1992 | Lepri et al. | 385/111 |
| 5,134,470 | 7/1992 | Ravetti | 385/98 |
| 5,138,689 | 8/1992 | Merlo et al. | 385/135 |
| 5,157,751 | 10/1992 | Maas et al. | 385/99 |
| 5,159,653 | 10/1992 | Carpenter et al. | 385/95 |
| 5,249,246 | 9/1993 | Szanto | 385/97 X |

*Primary Examiner*—John D. Lee
*Assistant Examiner*—Phan T. H. Palmer

[57] ABSTRACT

Optical fibers typically used for data signal transmission are connected to each other in an orientation which provides self-aligning of the fiber ends. An alignment cavity is used to accept two optical fibers and guide them to a precise position with accurate alignment of the cores of the fibers. A housing unit may be employed to secure the optically aligned, joined fibers in an isolated, fixed orientation. The alignment cavity can be re-positioned automatically by the fibers entering to assure a preferred optimum alignment of the fiber ends in a vee groove internal configuration. Retaining elements are crimped to secure the fiber ends in the preferred orientation. The retaining elements may have an opening through which the optical fibers, bare or buffered may pass. Retaining elements may also capture the strength members of the optical fiber cables. The method of joining the fibers includes fiber end preparation, buffer stripping and strength member/cable jacket preparation, placement of retaining members, crimping and/or heat activation of joining members, and fixing the fibers/cables within a protective housing. Retaining of the buffered fibers and/or of cable in housing ends maintains fiber-to-fiber alignment in a fixed relationship with the housing, while transferring all tensile cable stress to the rigid housing, keeping the optical fibers isolated from any tensile stresses.

9 Claims, 8 Drawing Sheets

OPTICAL FIBER SPLICE INTERCONNECTION AND USAGE METHOD

The invention relates to mechanical optical signal or power transmitting fiber splices and methods of self-alignment for such splices. The design of splices presented provides durability and assembly methods which can be quickly and easily used in field splicing applications without the use of special tools.

BACKGROUND OF THE INVENTION

Optical fibers are commonly used as telecommunications signal transmission medium and increasingly for signal and power transmission in military, space and aerospace applications. A universal requirement is precise, accurate center-to-center alignment of the optical fibers at such points in the optical transmission as require a joining, connectorization or splicing. Field splicing or interconnecting in particular requires methods which are easily accomplished offering as much automated or simple assembly steps as possible. Previously, large bulky splice organizers of generally cylindrical shape have been used to isolate and protect simultaneously dozens or hundreds of relatively fragile buffered fiber splices in an open, easily tangled common chamber. Coils of fiber were stored in close proximity to the splices fastened to the splice organizer wall. In recent prior art, newer, smaller, independent single fiber in-line splices have been shown with smaller housings for individual fiber optic cable splices including strength member terminations and fiber-to-fiber mechanical splices using epoxy and or electric power for curing the splice. There can be safety problems in some environments of repair which preclude the use of any electrical arcing for chemical adhesive curing, the arcing which may ignite flammable liquids in such an environment. Also, the chemical adhesives are sometimes dangerous for technician use in confined environments or the adhesives can flow out of desired locations. Worse still are shelf-life limitations which may render the adhesive unable to provide the desired bond.

To advance the art, it is desirable to provide a small, easily installed fiber optic splice which will offer low-loss fiber-to-fiber splicing with easily accomplished methods for field applications. Enhancing such field assembly will include use of components which will promote self-aligning of the optical fibers not dependent upon operator skill in terminating. It is also desirable for a field splice unit to capture strength member portions of the fiber optic cable, permanently attaching them in such manner as to eliminate any tensile loading on the optical fibers themselves. Another desirable characteristic of a field splice is assembly methods which do not necessarily require use of chemical adhesives or electrical power unsuitable in confined field environments where such elements may create hazardous conditions. It is advantageous to employ only ordinary tools requiring ordinary skill of an assembler in field termination environments.

SUMMARY OF THE INVENTION

In view of incorporating the desirable characteristics while avoiding drawbacks described above the present invention accomplishes the goals of providing a fiber optic fiber-to-fiber or cable-to-cable splice in a miniature size assembly with low-loss precision alignment of the optical fibers being joined. Field assembly is accomplished with simple, hand operated ordinary-skill tools.

One feature of the present invention is an element which provides a novel self-alignment of bare fiber ends, or thinly coated/buffered fiber ends when fibers are inserted into the splice elements.

Another feature of the invention provides a positive capture of the fibers or strength membered cables in such a manner as to assure that once terminated and positioned, the fibers and/or cables will remain in this final position. When cables are terminated, tensile stresses will be transfered through cable strength member-to splice housing-to cable strength member, leaving the optical fiber free of any tensile loading.

Yet another feature of the present invention allows the novel self-aligning element to be used with bare fiber-to-fiber splicing, with buffered fiber-to-fiber splicing or with fiber optic cable-to-cable splicing.

A further feature of the present invention is the provision of low loss fiber optic splicing with the self aligning member which may have, but is not required to have, index-matching substance confined internally to enhance the transmission of signal across the joint of the concatenated fibers.

Still another feature of the present invention provides ruggedized construction to isolate the fiber-to-fiber splice from adverse mechanical or environmental conditions which may occur in field use, while also providing moderate cost for the splice by using relatively simple, inexpensive components for constructing the splice.

An additional feature of the present invention is the use of simple, ordinary assembly tools and components enabling splice termination in confined, difficult access areas when necessary.

Another feature of the invention enables using an additional embodiment terminus to be used with the novel self-alignment feature, one terminus affixed to one fiber and a mating terminus affixed to another fiber which are brought slidingly together and the novel self-aligning fiber guide is employed to achieve low loss splicing.

The above noted features are incorporated in the present invention which has a first portion self aligning tube for fiber-to-fiber splicing with a configuration having a plurality of three or more angular, intersecting planar grooves internal to the tube, the tube having a round external configuration in the first embodiment, this round external configuration assuring that rotational adjustment can take place as needed for precise alignment. This tube is located within a second portion protective casing or housing which serves to protect the fiber-to-fiber splice and which incorporates features to capture the strength member and jacket of the fiber optic cable structure entering therein on either end of this housing. The capture of the strength member provides clamping to secure cable members to this splice case or housing assuring protection for fibers from external environment and isolating fibers from tensile loading. The orientation of the first portion of the splice within the second ruggedization portion is such that the center axis of the first portion does not coincide with the center axis of the second portion, thereby forcing the fiber ends to deviate from straight passage therethrough the first portion alignment tube and assures they will meet in precise alignment in one of the internal angular grooves provided.

A second embodiment of the invention is a jig or alignment fixture which can be used to orientate prepared optical fibers within a first portion self alignment tube in such manner as to position the fibers with the axis of the self-alignment tube not coinciding with the axis of the fibers and furthermore with a controlled curving entry of fibers into the self alignment tube such that the curvature may be incrementally adjusted with a variable positioning device for active, optimum alignment of fiber ends. The round periphery of the self alignment tube will assure that the tube will rotate a portion of a revolution as forced by the stiff glass or plastic or other optical fibers entering therein at the opposite ends of the tube and as the fiber curves, the fibers force themselves into one of the internal grooves or corners thereby assuring that precise alignment and close proximity of fiber ends will result in a superior cleave.

The method of splice termination of the invention requires that the buffered optical fiber be exposed at a certain prescribed distance, free of cable jacket and strength members. A buffered fiber with no jacket/strength members may also be used. This buffered fiber is stripped to a certain prescribed distance and then entered into one end of the splice housing, passing therethrough until entering the central self alignment tube opening. This self aligning tube has a generous flared entry and is offset from the axis of the housing such that the fiber is forced to move away from the straight orientation. This forced curving away of the fiber causes the fiber to apply pressure on the inside wall of the alignment element, the fiber forces the tube to rotate until the fiber is in one of the internal grooves. The fiber entering the opposite end is moved in like manner, the result being that the fiber ends come slidingly together and align precisely concentrically in abutment, abutment being limited in force by stopping features of the members crimped into the splice housing.

The aforementioned will become more apparent in the detailed description which follows, and which is described in conjunction with the drawings which are:

DETAILED DESCRIPTION

Figure 1A:
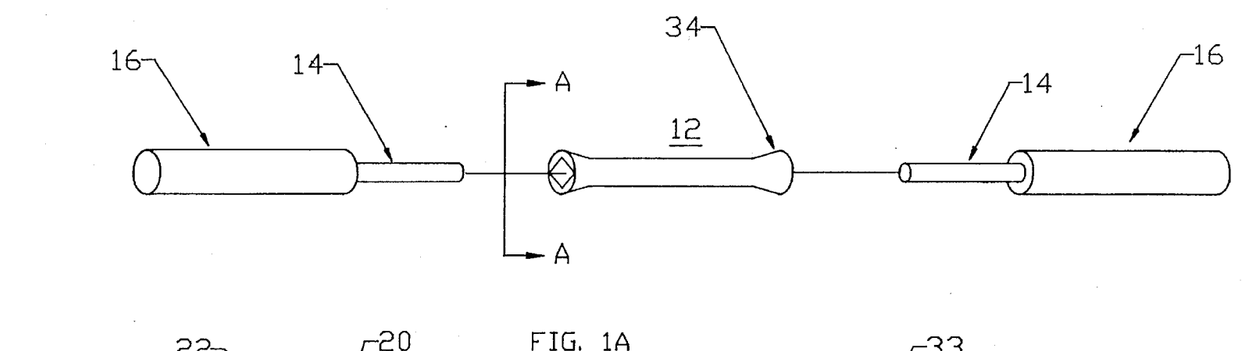
FIGS. 1A–1E are is a perspective views of the complete splice 10 terminating a strength-membered, jacketed fiber optic cable, with details showing the internal self-aligning tube, an end view of the tube, a cross section view of the tube with fibers entering offset, and a cross section view of the fibers joined together within the self-aligning tube
Figures 1B, 1C, 1D, 1E:
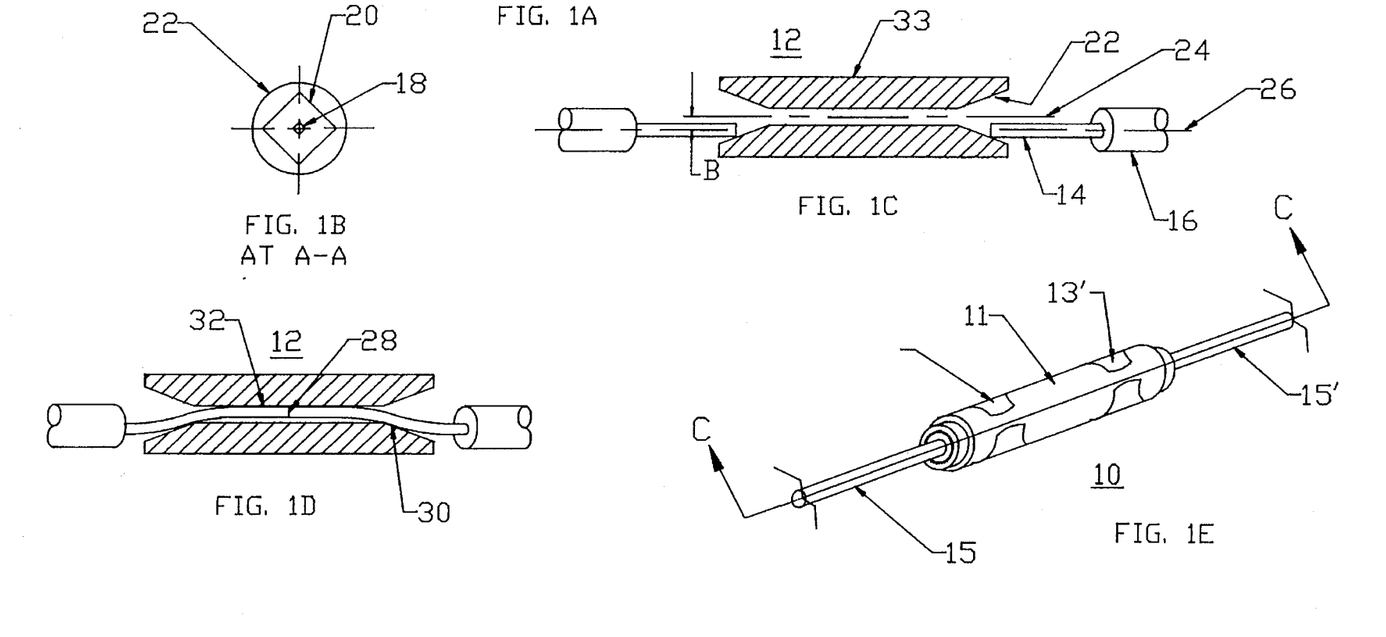

FIGS. 1A–1E show perspective views of one embodiment of a fiber optic cable splice 10 in assembled form with supportive detail views shown in FIGS. 1A–1E to 3 inclusive. A housing 11 of generally tubular construction has first and second end regions 13 and 13' which are crimpable to secure internal members, said housing preferably constructed of a metallic material which is suitable for crimping. This housing has a central portion which contains the elements for aligning the optical signal-carrying fibers 14 and accommodates prepared fiber optic cables 15 and 15'. Said housing is constructed in a similar manner to that shown in U.S. Pat. No. 5,085,494. The alignment means 12 has novel features and a particular placement within said splice assembly 10 to assure accurate alignment of abutting fibers 14. Typically, the optical fibers are constructed with protective buffer material 16 which is removed for a short controlled distance exposing bare fibers 14 which are to be aligned. In FIG. 1A, alignment means 12 can be seen with round external configuration and in FIG. 1B taken from view A—A of FIG. 1A, a square inside opening 18 extending lengthwise therethrough with flared entry of a generally square configuration 20. Said entry may be round or having a square configuration with generously rounded corners gradually transitional to the square inside opening 18 with nearly sharp corners effectively creating 4 length-wise grooves. There may be any number of lengthwise grooves formed with various geometric inside configurations such as a triangle, pentagon or any polygon shape. The square is used herein as an example. Ends 34 of alignment means 12 may be flared to a larger diameter than the central region or the entire alignment means 12 may have a common diameter 33 over the length. Alignment means 12 preferably has a pre-set index-matching fluid gel loaded within the central region where fiber-to-fiber abutment point 28 occurs. Fibers 14 are brought slidingly into the flared entry 22 of the alignment means 12 with the axes 26 of fibers 14 offset a particular distance B from the central axis 24 of alignment means 12. As fibers 14 are moved inwardly into openings 22, the arranged axial misalignment causes fiber 14 to contact flared entry 22 at a point a distance away from axis 24 equal to the sum of the distance between axes 24 and 26 plus one half of fiber 14 diameter. Furthermore, as fibers 14 are urged inwardly further simultaneously or one by one, the axial offset causes the fiber 14 ends to move continually further out of the natural straight axial direction such that the fiber 14 passes over transition point 30 and moves towards wall 32 of the alignment means 12 as seen in FIG. 1D. When fibers 14 are urged further inwardly, the ends of fibers 14 come into contact with wall 32 inside alignment means 12 causing fibers 14 to be forced to straighten out. As the fiber 14 ends are forced to straighten while continuing to be urged inward and while moving slidingly, force is applied to the square inside configuration 18 of alignment means 12 by fibers 14. This force will cause the alignment means 12 to rotate such that one of the square corners 18 which are actually lengthwise grooves, will align with the fiber ends 14 which are applying outward radial pressure on the inside of wall 32. Since the outside diameter 33 of alignment means 12 is round, this forced rotation of the alignment means 12 can take place. Both fiber ends 14 are guided into wall 32 of the alignment means 12 in like manner resulting in the fiber ends 14 slidingly coming to a mutually end—abutting relative orientation 28.

Figure 2A:
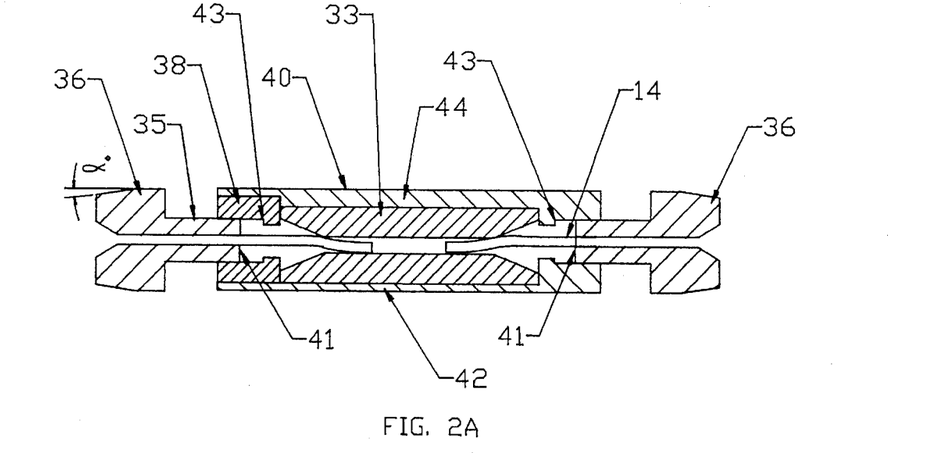
FIGS. 2A–2C are is a cross-sectional views of splice 10 in FIG. 1 at C—C first showing components loosely assembled with fibers entering and then showing fibers in place and crimping tool jaws at one end at D—D ready to be used.
Figure 2B:
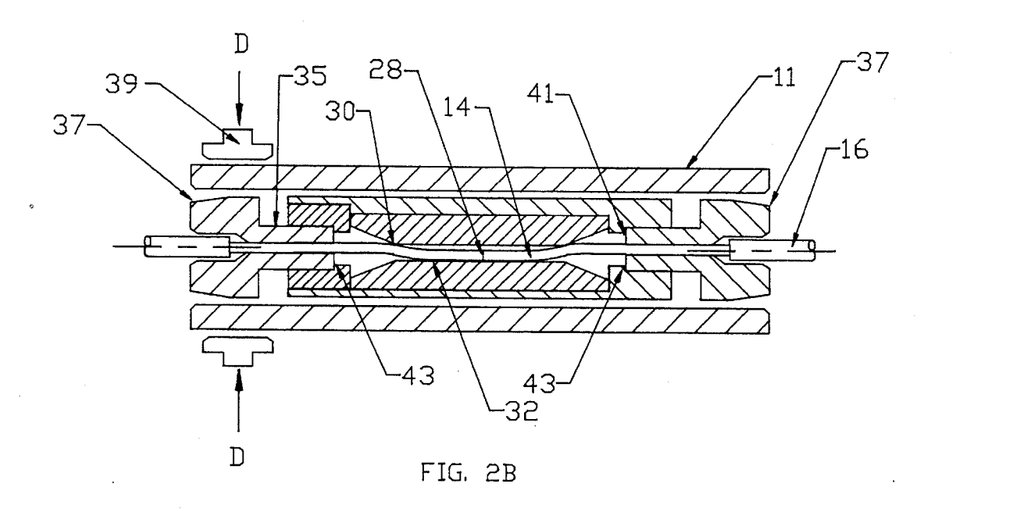
Figure 2C:
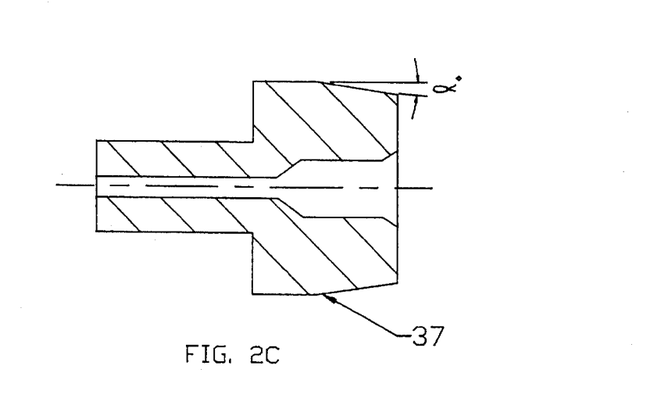

Additional splicing techniques for cable or strength member termination may be applied to an embodiment of the splice. FIG. 2A shows the fibers 14 entering alignment bushing 33 as already described. Axial offset is provided by housing 40 configured to have axial offset of the internal diameters with respect to the external diameter. The result is a thicker wall 44 on one side of housing 40 and a thinner wall 42 on the other side of housing 40. This arrangement assures offset fiber entry into alignment means 33. Bushings 36 are introduced to the splice to accommodate crimping of the hard-clad silica or thinly buffered fibers 14 internal to the bushings. Thin hard claddings or thin buffers such as polyimide buffer may be crimped in bushings 36. In FIG. 2B fibers 14 with substantially larger buffer coatings 16 may be accommodated with bushings 37. FIG. 2C shows an angle ° exterior configuration diameter transition which will enhance the clamping action of the crimp applied external to the splice assembly as in D—D of FIG. 2B. One possible crimp arrangement can be seen in FIG. 2B with crimp jaws 39 forced inwardly at D—D on housing 11 to deform first the housing 11, then the bushing 37 which in turn is clamped onto the fiber buffer. This clamping causes the buffer 16 or the thinly clad buffered fiber 14 to be securely crimped. Similar crimping may be applied to bushings 36 in FIG. 2A. Crimp tools may be pre-set for particular fiber or buffered fiber applications. Crimp bushings 36 or 37 are stopped as the front face 41 is urged to abutment with diameter transition 43 of entry guide 38. Bushings 36 and 37 may be pre-crimped at diameter 35 on hard-clad silica, buffered silica, or buffered plastic fibers when the fiber end is prepared prior to entry in the splice assembly. Fiber preparation may be by cleaving and/or polishing. Bushings 36 and 37 may enhance fiber positioning and control for the cleaving and the polishing operations. The bushings are an integral part of guiding, locating and positioning fibers in polishing tools and cleaving tools.

Figure 3:
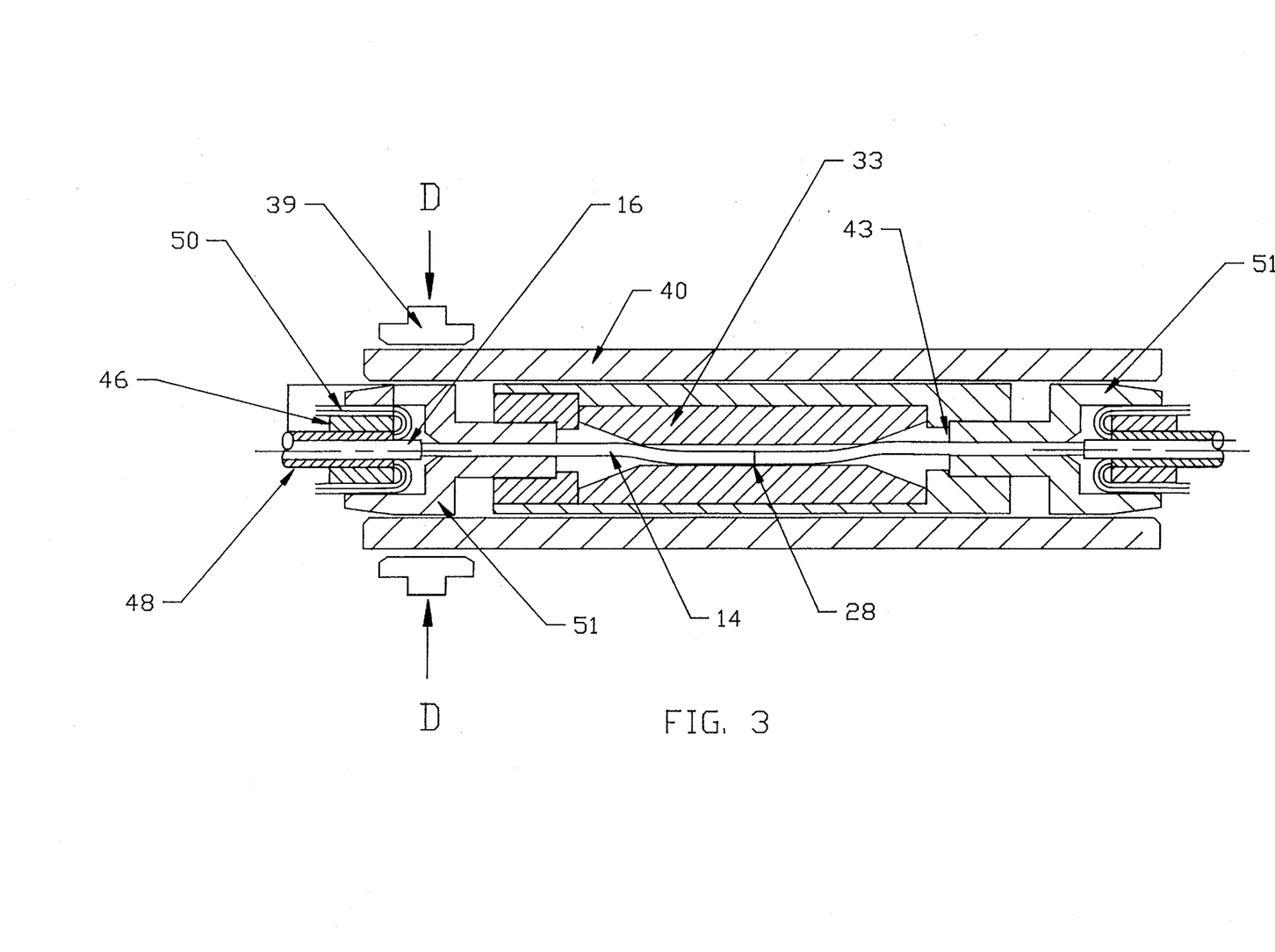
FIG. 3 is a cross sectional view of splice 10 in FIG. 1E at C—C having strength member cable termination in the housing ends with crimp tool jaws at one end at D—D ready to be used.

Still another item which can be accommodated is the jacketed, strength membered fiber as seen in FIG. 3. Again, fibers 14 are brought slidingly within the alignment bushing 33 and stopped at the necessary point of abutment 28 established by bushing 36 endface 41 stopping against transition corner 43 when fully seated. In this embodiment fiber 14 buffer 16 is surrounded by tensile strength members 50 which are enclosed within outer cable jacketing 48. Support bushing 46 provides a firm supportive surface when crimp jaws 39 act upon housing 40 which in turn compresses cable crimp bushing 51 which in turn captures strength member 50 between crimp bushing 51 and support bushing 46. Fiber optic cable jacket 48 is protected inside of support bushing 46. The crimping process is accomplished on both ends of the splice ensuring a firmly, permanently affixed fiber-to-fiber orientation.

Figure 4A:
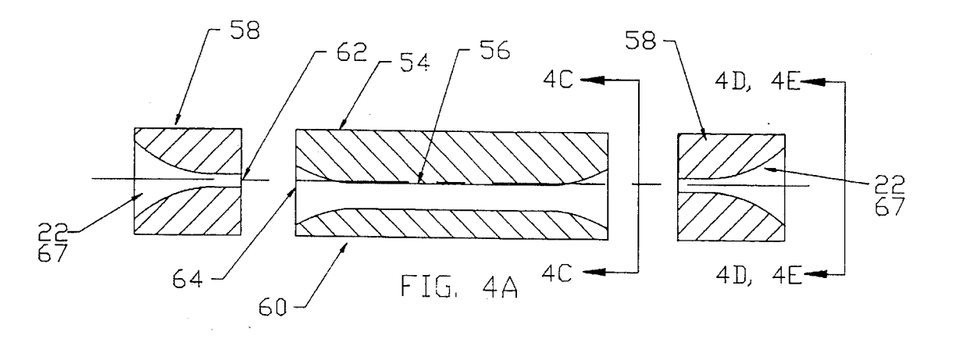
FIGS. 4A–4E shows a cross section of a second embodiment of the self-aligning tube in which construction is of 3 pieces rather than of a single piece as in FIGS. 1A–1E.
Figure 4B:
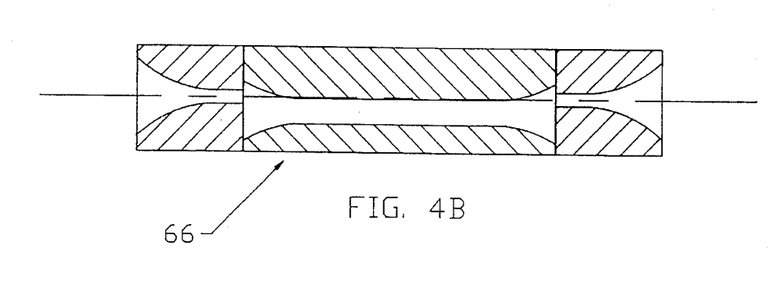
Figure 4C:
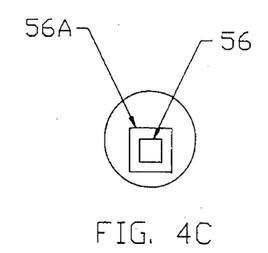
Figure 4D:
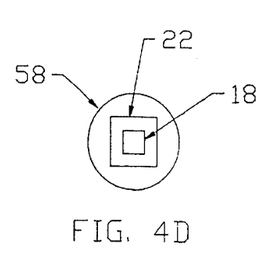
Figure 4E:
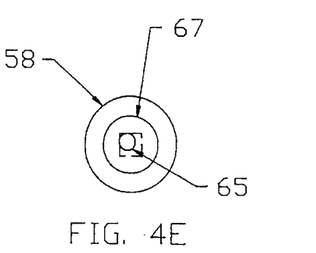

Yet another embodiment of the present invention can be seen in FIGS. 4A-4E. This variation uses a 3-piece fiber-to-fiber alignment means 66 as in FIG. 4B comprised of two identical but reversed orientation entry elements 58 each having a smoothly flared lead-in surface with opening 22 and a central alignment means 60 with uniform outside diameter and uniform inside configuration 56 as seen in FIG. 4C. Again, offset axis of fiber at entry causes fiber entry at an angle which presses against the inside configuration of central alignment means 60 causing rotation of 45° or less with a square inside configuration or other angles of rotation for other polygon shapes of inside configuration. This rotational movement is allowed by round, smooth outside diameter 54 and which will cause both fibers to align in a common groove-like feature running through the lengthwise direction of the alignment means, this groove feature being one of the sharp corners of the square inside configuration. Index matching gel pre-placed in the central area will assure low loss signal transmission. The entry of fibers 14 into this 3-piece alignment means assembly 66 occurs at opening 22 with an end configuration as seen in FIG. 4D. Here, a large entry opening 22 has a generally square shape smoothly flaring down to the square inside configuration 18 at exit 62. This opening 18 must be smaller than the continuous inside configuration 56 of alignment means 60 starting at entry 64 in order to assure smooth, uninterrupted fiber 14 entry into central alignment means 60. An alternative configuration F1 is shown also in which the large entry opening configuration 67 smoothly reduces to a round inside configuration 65 slightly smaller than inside square configuration 56 of the central alignment means.

Figure 5A:
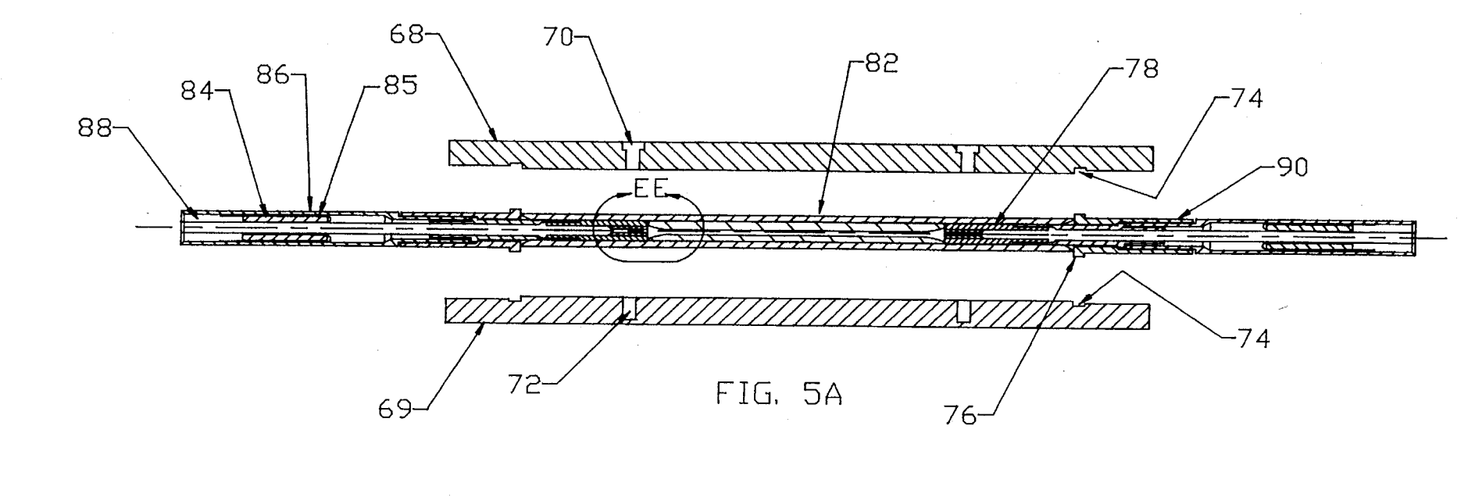
FIGS. 5A and 5B are cross sectional views of the splice of FIG. 1 with a two-piece housing case having fastener assembly rather than a single piece housing with crimp assembly.
Figure 5B:
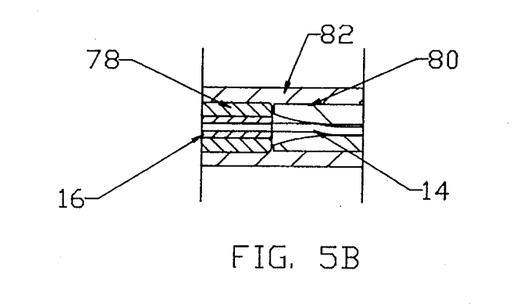

FIGS. 5A and 5B show an additional embodiment where two ferrule members 86 and 90 each house an optical fiber 14 crimped to stay in place and are brought slidingly into alignment tube 82 until they abut the ends of self-aligning means 80 with internal square configuration and with central axis offset from central axes of the two ferrule members 86 and 90. Each ferrule member may have support collar 84 to trap strength member 85 and cable jacket 88 between crimp support collar 84 and ferrule tail 86 in a crimped confinement thereby affixing the fiber optic cable and transferring tensile stresses to the ferrule members 86 and 90, away from fibers 14. Cable jacket 88 is protected within the opening of ferrule 86. Tips 78 align fiber centrally such that entry into the self alignment means 80 will assure mis-match of axes between fiber and alignment means 80. Self alignment rotation and abutment will occur as described earlier. FIG. 5B shows the tip 78 in close proximity to self aligning tube 80, slight gap between established by ferrule members 86 and 90 having flanges 76 which stop against the ends of outer tube 82. Fiber buffer 16 is removed prior to entry into self aligning means 80 of fiber 14. A two-piece housing with halves 68 and 69 sandwich over the aforementioned elements, aligning and capturing members with grooves 74 catching flanges 76 to secure the alignment means 82 and ferrule members 86 and 90 therewithin. Since cable strength members 85 are captured by ferrules 86 and 90 which are in turn captured by bodies 90, the cable tensile stresses are thus transferred through flanges 76 to confining grooves 74 and housing halves 68 and 69 thus isolating the fiber-to-fiber splice within self-aligning tube 80 from any influence of tensile or compressive axial cable forces. Openings 70 accept fasteners which secure half 69 at threaded or rivet-points 72.

Figure 6A:
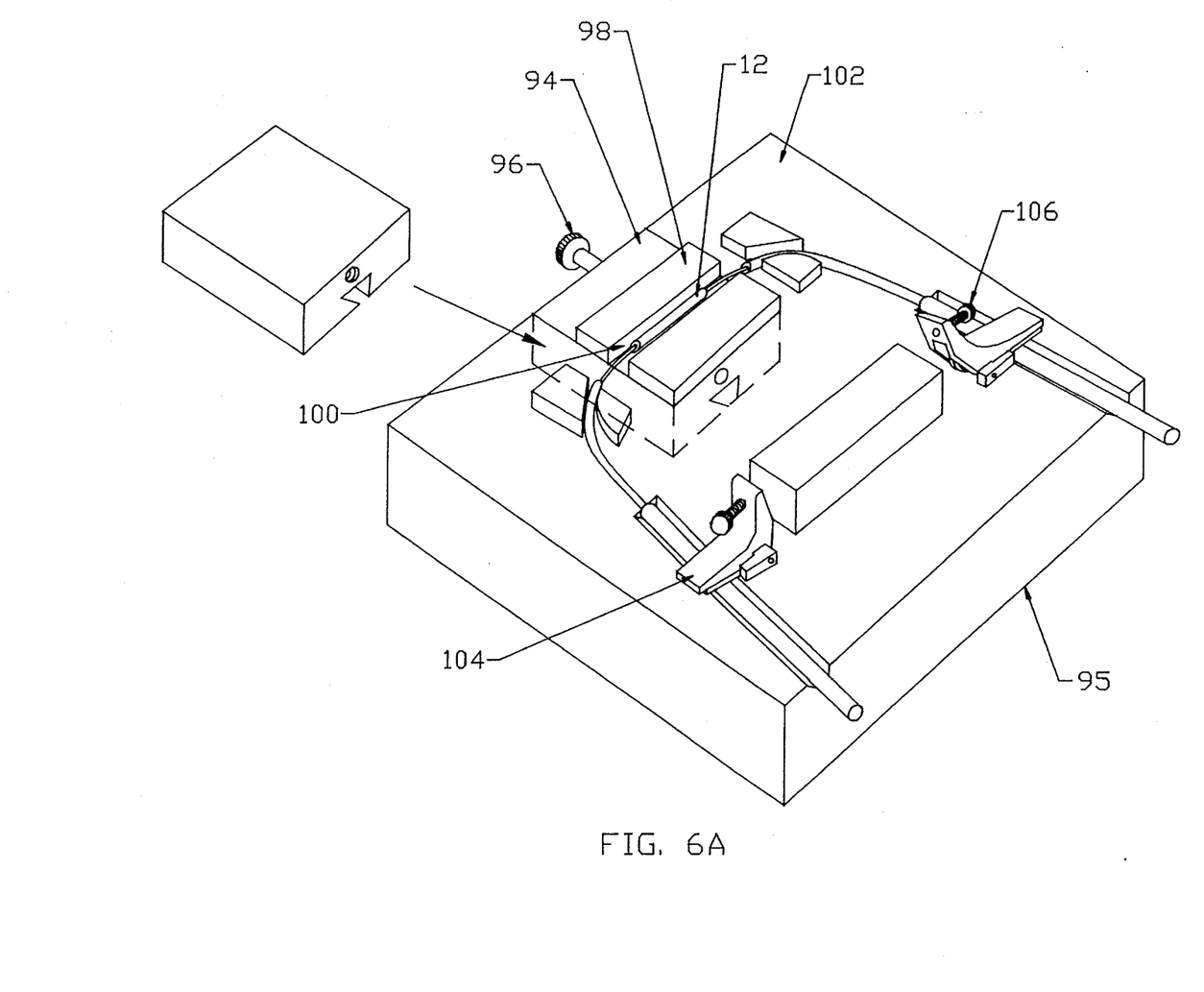
FIGS. 6A and 6B are additional embodiments with adjustable fiber position and radius of arc entry to be used with active alignment and U.V. cure.
Figure 6B:
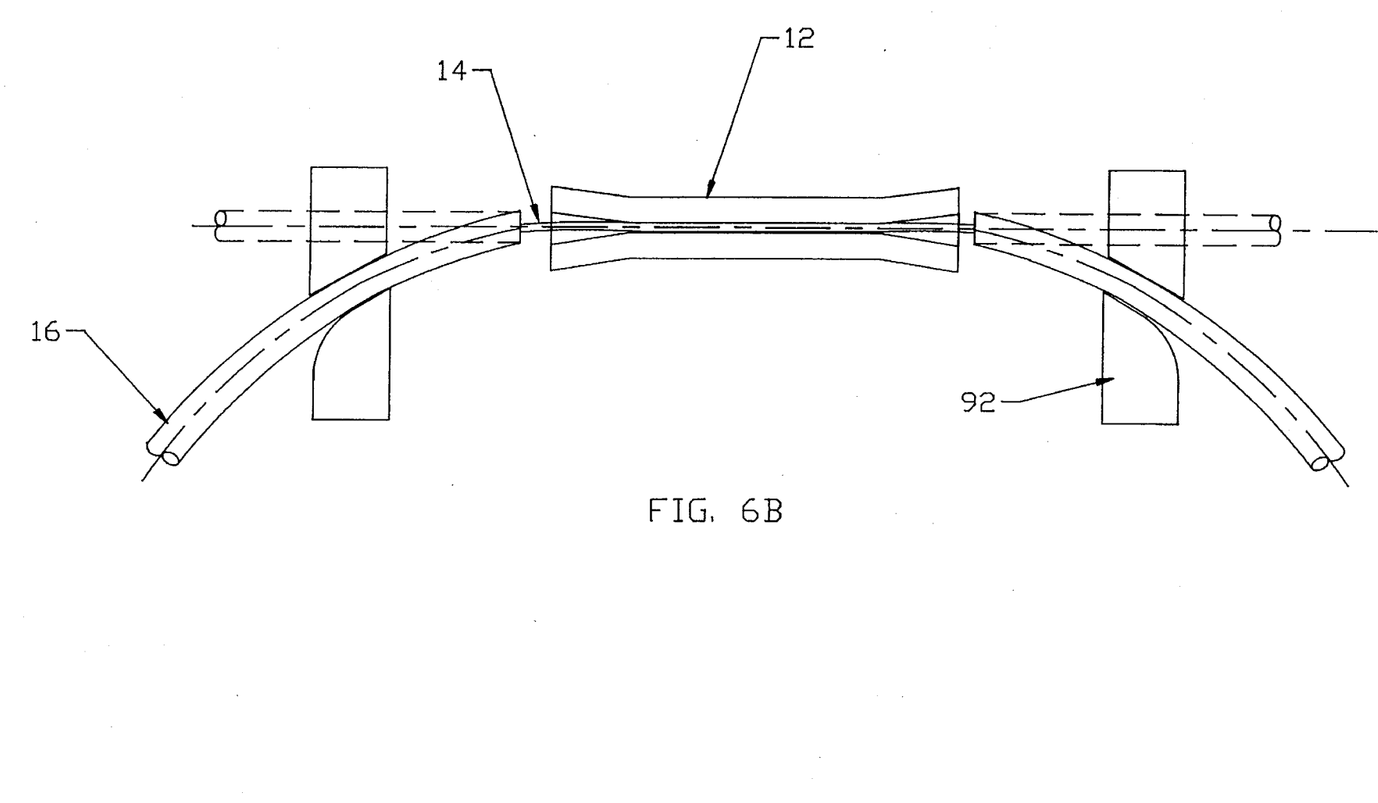

An alternative embodiment for active alignment of fibers 14 with buffer coat 16 is shown in FIG. 6A in an alignment means adjusting fixture 95. In this embodiment of the present invention, fibers 14 are brought slidingly together within alignment means 12 as in FIG. 6A. Following entry into alignment means 12, the fibers are bent into fiber supports 92, creating the same forcing of fiber ends into one wall of the alignment means 12 causing rotational adjustment of fibers 14 in the lengthwise grooves provided by the square inside configuration. As seen in FIG. 6A, the elements of FIG. 6B are located in a groove 100 allowing the required rotational freedom of alignment means 12. Base plate 102 has all other elements affixed to it such as buffered fiber 16 or cable portions being clamped by clamps 104 with tightening adjusting knobs 106. A set of positioning flanges 98 form groove 100 mounted to sliding block 94 which can be adjusted by rotating knob 96 in a number of ways, the way depicted being a dovetail arrangement which allows slidingly incremental adjustment. This adjustment causes fiber 14 increased or decreased bending within alignment means 12 as required for best active alignment where monitoring of signal strength during this fiber bending adjustment takes place with an optical signal being transmitted through one splice fiber 14 and optical measured detection simultaneously being conducted at the output end of the other splice fiber 14. Active alignment can be used in a field environment where ultra low-loss signal transmission is required.

Figure 7A:
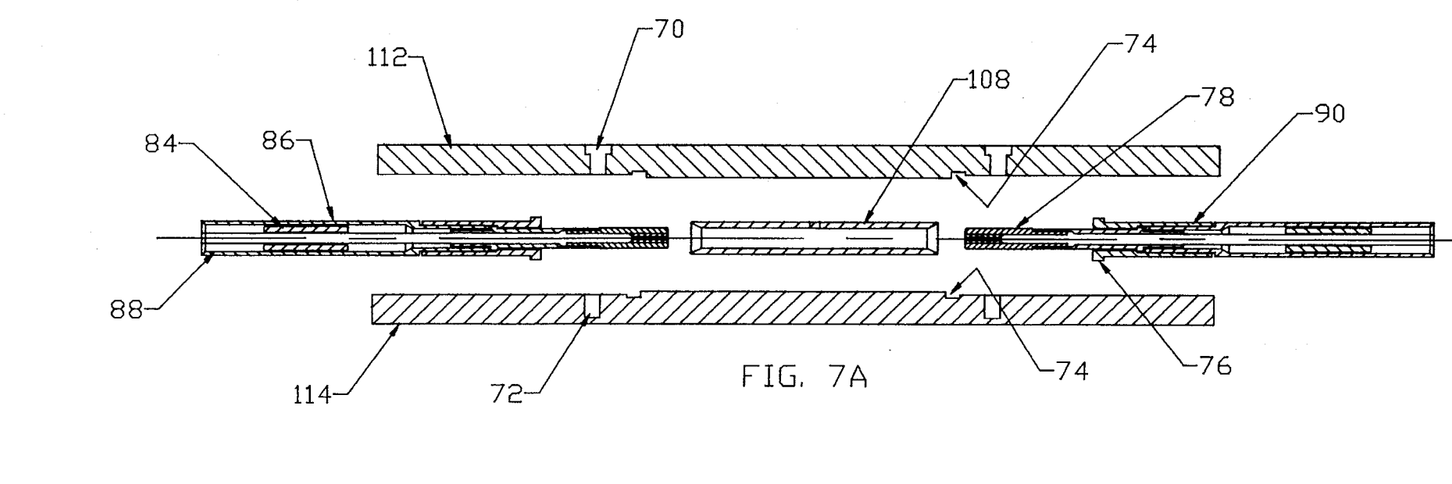
FIGS. 7A and 7B are other embodiments with crimped fiber positioning members which slidingly enter a straight alignment tube and arc captured in a housing as in FIGS. 5A and 5B.
Figure 7B:
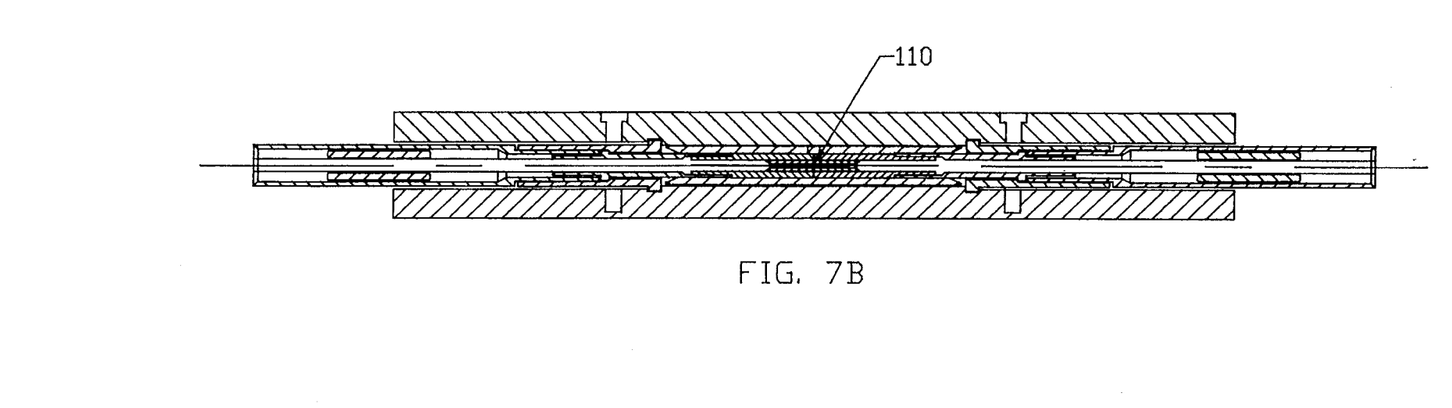

Another variation of the present invention is seen in FIGS. 7A and 7B where the two fibers to be joined in a field splice are crimped into ferrule assemblies as in FIGS. 5A and 5B except that the alignment of fibers is a straight fiber-to-fiber butt joint having precision tips guiding fiber ends concentrically within an alignment means 108 seen in FIG. 7A with fiber ends meeting in close abutment at 110 in FIG. 7B. Housing halves 112 and 114 are sandwiched over the aligning and capturing members as described for FIG. 5A assembly, securing ferrules by flanges 76 and maintaining fiber ends in fixed relative positions of mutual abutment at 110 within alignment means 108.

What is claimed is:

1. An optical fiber splice arrangement where optical fibers are brought together in an abutting central axis mutually— aligned orientation internal to an alignment means which has:

a square, triangular or other polygonal inside configuration continuing lengthwise therethrough thus forming alignment grooves in which optical fibers may be aligned in mutual abutment, a round, smooth outside diameter configuration of the alignment means which will allow alignment means rotation as necessary when internal forces induced by optical fibers bent in a misalignment orientation to the central axis of the alignment means outside diameter are applied within the alignment means, a smooth entry of generous oversized generally flared opening to accept fibers as they are urged slidingly therein, and guided at an angle to the entry axis, an arrangement whereby the axes of two optical fibers are mutually aligned but are simultaneously misaligned with respect to the axis of the alignment means thereby causing fibers to be forced to one side of the alignment means upon entry, an arrangement whereby optical fibers entering the alignment means will force the alignment means to rotate as required so that optical fibers will thus self-align with mutually coincidental axes in any one of the grooves thus formed by intersecting planes of the polygonal interior configuration, said groove providing for fiber-to-fiber abutment and alignment, the groove used being that closest to the fibers as they enter the alignment means, an arrangement whereby the optical fiber endfaces will meet in precise axial alignment and abutment by mutual orientation in one of said offset grooves, an arrangement whereby the end-to-end relative mutually abutting position of optical fibers is controlled by built-in stopping features of splice elements affixed with bias force to the fibers or buffer portion of said fibers within the splice assembly.

2. The optical fiber splice of claim 1 whereby mechanical crimping is employed to affix the optical fiber/cable within crimped elements of the optical fiber splice arrangement.

3. The optical fiber splice of claim 1 whereby bonding adhesive such as epoxy is employed to affix the optical fiber/cable within elements of the optical fiber splice arrangement.

4. The optical fiber splice of claim 1 whereby any means of affixing the optical fiber/cable within elements of the optical fiber splice arrangement is employed, other than with mechanical crimping or with bonding adhesive.

5. The optical fiber splice of claim 1 where the alignment means may be flared over-sized at ends to facilitate fiber entry and ease of rotational adjustment as necessary.

6. The optical fiber splice of claim 1 where the alignment means may be of 3-piece construction with a central member of uniform round outside diameter and flared entry, straight through-wise offset axis polygon cross-section configuration such as but not limited to a square inside central member to provide an offset arrangement.

7. The optical fiber splice of claim 1 with the round outside diameter/polygonal inside configuration alignment member constructed of glass, ceramic, plastic, metal or any other suitable material which will maintain a shape having smooth surfaces both inside and outside.

8. The optical fiber splice of claim 1 with means of terminating optical fiber cable strength members within the splice assembly or external to the splice assembly using preferably mechanical crimping but not limited to crimping if adhesive bonding or other suitable means of terminating the strength members is desirable for a particular application.

9. The optical fiber splice of claim 1 where optical fiber end preparation is by cleaving or polishing or cleaving and polishing and where the fiber end may be prepared prior to affixing within elements of the optical fiber splice assembly or following affixing within elements of the optical fiber splice assembly.

\* \* \* \* \*